US012220837B2

United States Patent
Okinaka

(10) Patent No.: US 12,220,837 B2
(45) Date of Patent: Feb. 11, 2025

(54) METHOD FOR PRODUCING ARTICLE CONTAINING SILICON CARBIDE AS MAIN CONSTITUENT, AND RAW MATERIAL POWDER USED IN THE METHOD

(71) Applicant: CANON KABUSHIKI KAISHA, Tokyo (JP)

(72) Inventor: Motoki Okinaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 17/848,220

(22) Filed: Jun. 23, 2022

(65) Prior Publication Data

US 2022/0324135 A1 Oct. 13, 2022

Related U.S. Application Data

(63) Continuation of application No. PCT/JP2020/048063, filed on Dec. 23, 2020.

(30) Foreign Application Priority Data

Dec. 24, 2019 (JP) .................................. 2019-233230
Dec. 17, 2020 (JP) .................................. 2020-209577

(51) Int. Cl.
 *B28B 1/00* (2006.01)
 *B33Y 10/00* (2015.01)
 (Continued)

(52) U.S. Cl.
 CPC .............. *B28B 1/001* (2013.01); *B33Y 10/00* (2014.12); *B33Y 70/00* (2014.12); *C04B 35/573* (2013.01); *C04B 35/65* (2013.01); *C04B 35/657* (2013.01); *C04B 2235/3826* (2013.01); *C04B 2235/422* (2013.01); *C04B 2235/428* (2013.01);
 (Continued)

(58) Field of Classification Search
 CPC ....... B33Y 70/00; B33Y 10/00; C22C 29/065; C22C 1/05; C04B 35/65; C04B 35/657; C04B 35/573; C04B 2235/6586; C04B 2235/5445; C04B 2235/428; C04B 2235/3826; C04B 2235/422; C04B 2235/5436; C04B 2235/667; C04B 2235/616; C04B 2235/6567; C04B 2235/6026; C04B 2235/665; C04B 2235/48; B28B 1/001
 See application file for complete search history.

(56) References Cited

FOREIGN PATENT DOCUMENTS

| CN | 106083059 A | 11/2016 |
|---|---|---|
| JP | 2002331591 A | 11/2002 |

(Continued)

OTHER PUBLICATIONS

CN 106083059 (translation) (Year: 2016).*

*Primary Examiner* — Monica A Huson

(74) *Attorney, Agent, or Firm* — Canon U.S.A., Inc. IP Division

(57) ABSTRACT

A method for producing an article containing silicon carbide as the main constituent includes a plurality of sets of steps of forming a layer of a raw material powder and irradiating the layer with laser light according to three-dimensional model data. The low material powder is a mixture of silicon carbide powder, metallic silicon powder, and carbon powder. The laser light used in the step of irradiation with laser light has a spatial laser power density of 11 $J/mm^3$ to 50 $J/mm^3$.

20 Claims, 3 Drawing Sheets

(51) Int. Cl.
*B33Y 70/00* (2020.01)
*C04B 35/573* (2006.01)
*C04B 35/65* (2006.01)
*C04B 35/657* (2006.01)

(52) U.S. Cl.
CPC ............. *C04B 2235/5436* (2013.01); *C04B 2235/5445* (2013.01); *C04B 2235/6026* (2013.01); *C04B 2235/667* (2013.01)

(56) References Cited

FOREIGN PATENT DOCUMENTS

| | | | |
|---|---|---|---|
| JP | 2016525993 | A | 9/2016 |
| JP | 2016204244 | A | 12/2016 |
| JP | 2017171577 | A | 9/2017 |
| JP | 2018135223 | A | 8/2018 |
| JP | 2019064226 | A | 4/2019 |

* cited by examiner

| 1 | 9 | 2 | 10 |
|---|---|---|---|
| 11 | 3 | 12 | 4 |
| 5 | 13 | 6 | 14 |
| 15 | 7 | 16 | 8 |

METHOD FOR PRODUCING ARTICLE CONTAINING SILICON CARBIDE AS MAIN CONSTITUENT, AND RAW MATERIAL POWDER USED IN THE METHOD

CROSS-REFERENCE TO RELATED APPLICATIONS

This application is a Continuation of International Patent Application No. PCT/JP2020/048063, filed Dec. 23, 2020, which claims the benefit of Japanese Patent Application No. 2019-233230, filed Dec. 24, 2019 and No. 2020-209577 filed Dec. 17, 2020, all of which are hereby incorporated by reference herein in their entirety.

TECHNICAL FIELD

The present invention relates to a technique for producing an article containing silicon carbide as the main constituent by powder bed fusion.

BACKGROUND ART

As a method for producing prototypes with complex shapes or manufacturing a wide variety of particles in small quantities, additive manufacturing, or 3D printing, in which metal or resin powder is irradiated with laser light according to three-dimensional data for the article to be produced for object fabrication, is being increasingly used. In recent years, fabrication of articles made of SiC, TiAl, or other inorganic compounds difficult to work, as well as metal or resin, has been desired.

PTL 1 proposes a method for producing articles containing silicon carbide as the main constituent by powder bed fusion using a raw material containing silicon carbide particles and molding resin particles, such as those of nylon, polypropylene, or polyethylene terephthalate. Also, PTL 2 discloses an object fabrication method using a powder containing silicon carbide and a metal boride with a melting point lower than the sublimation point of silicon carbide.

CITATION LIST

Patent Literature

PTL 1 Japanese Patent Laid-Open No. 2017-171577
PTL 2 Japanese Patent Laid-Open No. 2019-64226

In a fabrication process performed by heating a mixture of silicon carbide particles and molding resin particles, as proposed in PTL 1, voids are formed in the article when the mixture is irradiated with laser light to sinter the irradiated portion. PTL 2 enables the fabrication of relatively dense objects because a eutectic of silicon carbide and a metal boride is used to retard sublimation of the silicon carbide. However, this process requires heating to the melting point of the metal boride, i.e., about 2000° C. or more, thus requiring high energy for fabrication.

Accordingly, a technique is desired for producing articles containing silicon carbide as the main constituent at lower energy than known methods by additive manufacturing, without using resin or other organic materials.

SUMMARY OF INVENTION

A first aspect of the present invention is a method for producing an article containing silicon carbide as the main constituent. The method includes a plurality of sets of steps of: forming a layer of a raw material powder; and irradiating the layer with laser light according to three-dimensional model data. The raw material powder is a mixture of silicon carbide powder, metallic silicon powder, and carbon powder. The laser light used in the step of irradiation with laser light has a spatial laser power density of 11 J/mm$^3$ to 50 J/mm$^3$.

A second aspect of the present invention is a raw material powder for producing an article containing silicon carbide as the main constituent by powder bed fusion. The raw material powder is a mixture of silicon carbide powder, metallic silicon powder, and the silicon carbide powder has a smaller average particle size than the metallic silicon powder, and the carbon powder has a smaller average particle size than the silicon carbide powder.

Further features of the present invention will become apparent from the following description of exemplary embodiments with reference to the attached drawings.

DESCRIPTION OF EMBODIMENTS

Figure 1:
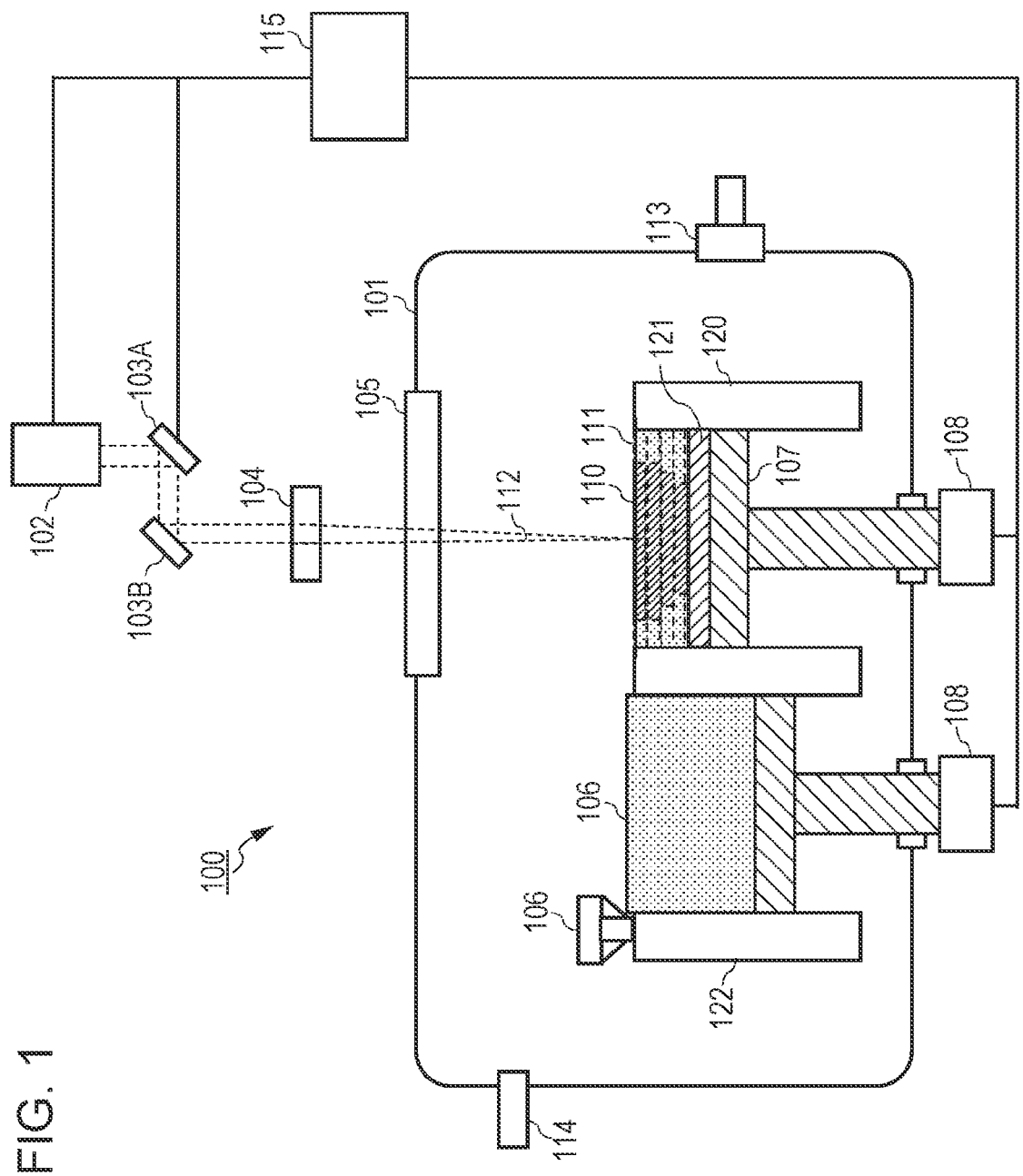
FIG. 1 is a schematic diagram of an apparatus used in the present invention.

A process called combustion synthesis is known as one of the methods for producing articles containing a high-melting-point inorganic compound as the main constituent. Combustion synthesis is a simple and economical method for promoting chemical combination by applying energy q to (by igniting) a part of powder composed of elements constituting an inorganic compound to induce a chemical reaction and allowing the heat of reaction Q generated during the chemical reaction to propagate as combustion waves through the powder. For example, a combustion reaction in which a chemical reaction between element A and element B produces compound AB is represented by formula (1). Note that, in the present invention, the main constituent of an article refers to the constituent accounting for 75 at % or more of the article.

$$A+B+q \rightarrow AB+Q \qquad (1)$$

q represents the energy applied, Q represents the heat of reaction and is expressed in the unit [KJ/mol], and q<Q. The reaction phenomenon of formula (1) is a noticeably short reaction that occurs within 1 second with an explosive temperature increase. Note that formula (1) is a representation from which the stoichiometric relationship is omitted.

For producing silicon carbide, it is preferable to use a chemical reaction between metallic silicon and carbon, according to formula (1), wherein A is metallic silicon (Si), and B is carbon (C).

Applying such a combustion synthesis process to powder bed fusion will likely enable the fabrication of objects containing a desired inorganic compound in a high proportion at low energy. However, the chemical reaction is not confined within the portion irradiated with laser light due to the propagation of the heat of reaction generated in the combustion synthesis process, as mentioned above. In addition, the explosive temperature increase may form voids in the sintered body, making it difficult to maintain the shape.

A study conducted to solve these issues has revealed that adding silicon carbide, which is produced by a reaction between metallic silicon and carbon, to powder of metallic silicon and carbon in advance can confine the propagation of the chemical reaction and the temperature increase within a predetermined region.

However, the expected effect of the addition of silicon carbide depends on the compositional ratio of metallic silicon powder, carbon powder, and silicon carbide powder. For producing silicon carbide, it is recommended to use a powder containing metallic silicon, carbon, and silicon carbide and having a silicon carbide content of 80 at % or more as the raw material powder. The silicon carbide powder added to the raw material powder reduces the reactivity between metallic silicon and carbon to restrict the propagation of combustion waves accompanying the combustion synthesis. In addition, probably, silicon carbide absorbs heat to suppress propagation of heat to the surroundings, thus enabling object fabrication while confining the explosive temperature increase within the region irradiated with laser light. Preferably, the atomic percentage of carbon contained in the raw material powder is higher than or equal to that of metallic silicon. By controlling the atomic percentage of carbon to be higher than or equal to the atomic percentage of metallic silicon, the carbon remaining without reacting with metallic silicon can be used as C that will be impregnated with metallic silicon for chemical combination in a solid-phase impregnation step described later.

FIG. 1 schematically depicts a diagram of a fabrication apparatus 100 suitable for use in powder bed fusion using the raw material powder according to the present invention. The fabrication apparatus 100, which is an apparatus for object fabrication using powder bed fusion, includes a chamber 101 whose internal atmosphere can be controlled with a gas introduction mechanism 113 and an exhaust mechanism 114. The chamber 101 houses a fabrication container 120 for fabricating three-dimensional objects and a powder container 122 containing a raw material powder that is a fabrication material (hereinafter also referred to simply as a fabrication material or powder). The chamber also houses a powder layer forming mechanism 106 for laying the raw material powder from the powder container 122 in the fabrication container 120 to form powder layers 111.

The exhaust mechanism 114 may have a pressure regulation mechanism, such as a butterfly valve, to regulate the pressure or may be configured to supply gas and adjust the atmosphere in the chamber in which the pressure is increased by the gas supply (generally called blow purging).

The bottoms of the fabrication container 120 and the powder container 122 are displaceable in the vertical direction with their respective lifting mechanisms 108. The bottom of the fabrication container 120 is configured as a stage 107 on which a base plate 121 is placed. The direction and amount of movement of the lifting mechanisms 108 are controlled by a controller 115, and the amounts of displacement of the stage 107 and the bottom of the powder container 122 are determined depending on the thickness of the powder layers 111 to be formed. It is desirable that the height resolution of the lifting mechanisms 108 be 1 μm or less because the lifting mechanisms 108 generally move up and down by a height of several tens of micrometers.

The base plate 121 is a plate made of stainless steel or other material that can melt. The surface of the base plate is melted together with the fabrication material when the first powder layer formed on the plate is melted and solidified, thus fixing the fabricated object to the base plate 121. Thus, the fabricated object on the base plate 121 can be held so as not to be displaced during fabrication. After completion of the fabrication, the base plate 121 is mechanically removed from the resulting object. The base plate may be provided in advance with a Ti film over the fabrication face of the base plate to enhance the adhesion between the base plate and the fabricated object.

The powder layer forming mechanism 106 includes a powder housing in which the raw material powder is housed and a feed mechanism operable to feed the raw material powder from the powder container 122 to the fabrication container 120. The powder layer forming mechanism further includes at least either a squeegee or a roller to level the powder layer on the base plate 121 to a predetermined thickness. To increase the density of the resulting object and promote the chemical reaction of the powder, a configuration is preferred in which the powder layer forming mechanism has both a squeegee and a roller, and first adjusts the powder layer thickness with the squeegee and then presses the powder layer with the roller to increase the powder layer density.

The fabrication apparatus 100 further includes an energy beam source 102 for causing combustion synthesis of the raw material, scanning mirrors 103A and 103B for scanning an energy beam 112 in two axes, and an optical system 104 operable to focus the energy beam on the portion to be irradiated. Since the energy beam 112 is emitted from the outside of the chamber 101, the chamber 101 has an introduction window 105 for introducing the energy beam 112 inside. The power density and scanning position of the energy beam are controlled by the controller 115 according to the three-dimensional model data that the controller 115 has received for the object to be fabricated and the properties of the fabrication material. Also, the positions of the fabrication container 120 and the optical system 104 are adjusted in advance so that the beam has a desired diameter at the surface of the powder layer 111. The beam diameter at the surface of the powder layer 111 affects fabrication accuracy and is therefore preferably set to be 30 μm to 100 μm.

Galvano mirrors may be suitably used as the scanning mirrors 103A and 103B. It is desirable that the galvano mirrors be made of a lightweight material having a low linear expansion coefficient because the galvano mirrors are operated at high speed while reflecting the energy beam.

Laser light is widely used as the energy beam 112. Although YAG lasers are often used, $CO_2$ lasers or semiconductor lasers may be used. The mode of operation may be a pulsed mode or a continuous emission mode. The laser light is preferably selected according to the absorption wavelength of the powder and can be light with a wavelength of which 50% or more, preferably 80% or more, is absorbed by the powder.

Methods for controlling the irradiation intensity of the laser light include a method in which the in-plane laser power density is controlled and a method in which the spatial laser power density is controlled. In-plane laser power density is the irradiation intensity of laser light per unit area and is expressed in the unit $J/mm^2$. Spatial laser power density is the irradiation intensity of laser light per unit volume and is expressed in $J/mm^3$. When an object is fabricated with thicknesses controlled as a 3D printer does, it is appropriate to consider spatial laser power density. Spatial laser power density J is represented by the following equation:

$$J = W/(P \times V \times D)$$

Here, W represents the irradiation power of laser light, P represents the irradiation pitch of the laser light, V represents the scanning speed of the laser light, and D represents the laid powder thickness. For a typical apparatus, the laser power W that can be output is 10 W to 1000 W, the laser irradiation pitch P is generally 5 μm to 500 μm, the laser scanning speed is generally 10 mm/sec to 10000 mm/sec, and the laid powder thickness D is generally 5 μm to 500 μm. When an object is fabricated with the raw material powder of the present invention, the spatial laser power density J may be controlled in the range of 11 J/mm to 50 J/mm$^3$ by controlling the parameters W, P, V, and D within the above ranges. The lower limit, i.e., 10 J/mm$^3$, is the energy required to sufficiently melt the powder, and the upper limit, i.e., 50 J/mm$^3$, is a limit above which fabrication is impossible because the powder volatilizes.

For fabrication, the base plate 121 is placed on the stage 107, and the interior of the chamber 101 is purged with an inert gas, such as nitrogen or argon. After the completion of purging, the powder layer forming mechanism 106 forms a powder layer 111 on the base plate 121. The powder layer 111 is formed at the slice pitch of slice data produced from the three-dimensional shape data for the object to be fabricated, that is, at a thickness according to the layering pitch. Then, the energy beam 112 is scanned according to the slice data to irradiate the powder in a predetermined region with laser light.

Upon completion of the laser irradiation of one powder layer according to the slice data, the lifting mechanisms 108 move down the fabrication stage 107 by the layering pitch and move up the bottom of the powder container 122 according to the layering pitch. Then, the powder layer forming mechanism 106 transfers the raw material powder in the powder container 122 to the fabrication container 120 and lays the powder over the layer scanned with the energy beam to form another new powder layer. This powder layer is irradiated with the energy beam 112 being scanned.

In the region irradiated with the energy beam 112, the surface of the layer that has been previously scanned with the energy beam 112 is also solidified again, as described above. When the portion right under the area of the new powder layer irradiated with the energy beam 112 is an area that has already been solidified, the materials at the boundary between the area of the new powder layer irradiated with the beam and the area previously melted and solidified are mixed and solidified, thus binding each other. By repeating these operations, an object 110 can be fabricated.

Figures 2A, 2B:
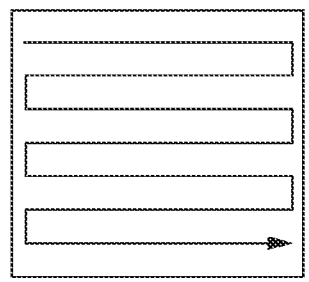
FIG. 2A is a schematic diagram illustrating laser irradiation like a single-stroke drawing.
FIG. 2B is a schematic diagram of an irradiation order when an area to be irradiated is divided into rectangular sections and the sections are discretely irradiated with laser light.

For irradiating powder layers with laser light, the area to be irradiated may be divided into rectangular sections, as depicted in FIG. 2B, and the sections may be discretely irradiated. Preferably, one rectangular section has a size of 5 mm×5 mm or less, more preferably 2 mm×2 mm or less. If the laser light is continuously scanned like a single stroke drawing, as depicted in FIG. 2A, heat of reaction is accumulated in turnaround portions, leading to varying compositions in the fabricated object or forming voids in the object. However, the discrete irradiation as depicted in FIG. 2B can restrict the propagation of combustion waves in in-plane directions to reduce the variation of heat of reaction at the fabrication face. The irradiation sections need not be rectangular and may be polygonal or circular. Non-rectangular sections each preferably have an area of 25 mm$^2$ or less, more preferably 5 mm$^2$ or less.

The particles in the raw material powder including the powders according to the present invention preferably have particle sizes of 0.5 μm to 100 μm and more preferably 1 μm to 70 μm. When the particles in the raw material powder have particle sizes in such a range, the particles have flowability suitable for forming powder layers in fabrication, thus enabling the fabrication of fine objects. The term particle size used herein refers to a Feret diameter (size in a specified direction) measured under a microscope.

In addition, the average particle sizes of the SiC, Si, and C particles are preferably smaller for compositions with higher melting points or sublimation points and preferably have the relationship: C powder<SiC powder<Si powder. By reducing the particle sizes of C and SiC in the raw material powder, which have relatively high melting points or sublimation points, melted Si can cover C and SiC particles to promote reaction or hinder sublimation. The average particle size of each powder in the raw material powder obtained by mixing the SiC, Si, and C powders can be determined by measuring the Feret diameters (sizes in a specified direction) of at least 1000 particles of each powder under a microscope and averaging the diameters. When SiC, Si, and C powders before mixing can be obtained or when the mixed powder can be separated into the individual powders, the average particle size of each powder is defined as the median diameter measured with a laser diffraction particle size distribution analyzer.

Even the raw material powder according to the present invention, containing the powders described above, will react explosively when the intensity of the irradiating laser light is excessively high. Accordingly, the laser power density can be controlled within a predetermined range according to the composition of the raw material powder to prevent an explosive reaction. More specifically, it is preferable to irradiate the raw material powder with laser light to the degree that Si and C are not completely combined and that Si, which has a melting point (1414° C.) lower than the decomposition point of SiC, i.e., 2545° C., melts and functions as a binder to physically bind other powders. Also, the raw material powder may be irradiated with laser light to the extent that the crystal structure of Si is partially substituted by C to form an intermediate product $Si_xC_y$. The Si-bound solidified product and the $Si_xC_y$-containing fabricated object can be entirely converted into SiC by subsequent heat treatment.

If the resulting object has voids, the object can be subjected to impregnation to increase the strength.

For SiC objects, solid-phase impregnation, liquid-phase impregnation, and vapor-phase impregnation are known. Solid-phase impregnation and liquid-phase impregnation are preferred because they can relatively easily increase the strength of the object. In particular, solid-phase impregnation can increase strength in a short time and is therefore preferred.

For solid-phase impregnation of a SiC object, it is recommended to load C in the voids of the object and then introduce melt of Si to turn the voids into SiC.

In solid-phase impregnation, first, voids are impregnated with a liquid resin by immersing a fabricated object in the liquid resin and defoaming the object in a vacuum. After unwanted liquid resin is removed from the surface of the fabricated object, the resin is heated to cure and is further heated to carbonize the resin. Thus, C is loaded in the voids. The resulting object is then brought into contact with melted Si in a vacuum to impregnate the voids with Si and is heated at 1450° C. to 1700° C., thus turning the voids into SiC. After the voids are turned into SiC, excess Si is deposited on the surface of the object but can be removed by post-processing such as polishing or etching.

The resin used to load C into the voids in the fabricated object is one containing no metal components. If the resin contains metal components, the metal components react with the Si in the fabricated object to produce unnecessary compounds. Also, the higher the residual carbon percentage of the resin, the higher the percentage of SiC in the voids. The residual carbon percentage of the resin is preferably 50% or more, more preferably 60% or more, and the resin is particularly preferably phenol resin.

To allow the resin to permeate into the voids, the viscosity of the resin is preferably 1000 mPa·s or less, more preferably 500 mPa·s or less.

For liquid-phase impregnation of a SiC object, commercially available SiC polymers (polycarbosilanes) may be used as SiC impregnation materials. The resulting fabricated object is immersed in a liquid of SiC polymer, and the SiC polymer liquid is introduced into the voids of the object by vacuum defoaming. After excess liquid is removed from the surface of the fabricated object, the object is heat-treated at 800° C. to 1300° C. in an inert gas atmosphere to turn the SiC polymer into an inorganic form. The SiC polymer is a SiC ceramic precursor containing organic matter, and about 30 wt % of the SiC polymer is lost by heat treatment due to volatilization. Thus, by repeating the impregnation and heat treatment steps a plurality of times, the void fraction of the object can be reduced. The SiC obtained by heat-treating the SiC polymer at 800° C. to 1300° C. is amorphous but can be crystallized to increase the hardness by additional heat treatment at about 1600° C.

Examples

Examples and Comparative Examples of the present invention will be described. However, it should be noted that the kinds, composition, particle size, and particle shape of the powders, the laser power, and the like in the following description are variable as appropriate according to the configuration of the apparatus to which the present invention is applied and various conditions, and are not intended to limit the present invention to the scope of the disclosed description.

Mixtures of SiC powder, Si powder, and C powder were used as raw material powders. Details of the powders are as follows:
SiC: having an average particle size of 15.0 μm produced by Shinano Electric Refining Co., Ltd. (product name: SSC-A15)
Si powder: having an average particle size of 45.0 μm produced by Kojundo Chemical Lab. Co., Ltd. (product name: SIE19PB)
C powder: having an average particle size of 5.0 μm produced by Kojundo Chemical Lab. Co., Ltd. (product name: CCE03PB)

Raw material powders with varying mixing proportions of SiC, Si, and C powders were prepared. Each raw material powder was irradiated with laser light under a plurality of laser irradiation conditions (at different spatial laser power densities) for fabrication.

The required amounts of the SiC, Si, and C powders were weighed and mixed in a ball mill.

The mixture of the powders was stored in a powder container 122, and the chamber was evacuated to a vacuum and then subjected to the step of introducing Ar gas a plurality of times to change the interior of the chamber into a $N_2$ atmosphere. The raw material powder in the powder container 122 was laid to a uniform thickness on a stainless-steel base plate 121 placed on the stage 107 by a powder layer forming mechanism 106. The height of the stage 107 was adjusted so that the powder had a thickness of 50 μm.

Then, the powder was irradiated with laser light for fabrication. A Nd:YAG laser with a wavelength of 1060 nm was used as the laser. The spatial laser power density was varied within the range of 11 $J/mm^3$ to 75 $J/mm^3$ by adjusting the scanning speed at a laser power of 100 W and an irradiation pitch of 40 μm. Thus, an object was fabricated according to a 4 mm×4 mm×250 μm three-dimensional rectangular solid model. After completion of the irradiation of the first layer with laser light, the powder was laid and irradiated with the laser light in the same manner as for the first layer. These steps were repeated until the resulting object had a desired height.

In the Comparative Example, an object was fabricated in the same manner as in the Examples by irradiating a raw material powder composed of SiC powder with laser light whose spatial laser power density was varied within the range of 11 $J/mm^3$ to 50 $J/mm^3$.

The stainless steel used for the base plate has high thermal conductivity and, accordingly, dissipates the irradiation heat of the laser light if the irradiation heat is low. If the energy of the irradiating laser light is low, the adhesion between the fabricated object and the base plate is low. Accordingly, before the fabrication of the rectangular solid model was started, an object composed of three layers was formed at a spatial laser power density of 100 $J/mm^3$ to form a base on which the rectangular solid model was to be fabricated.

Figure 3:
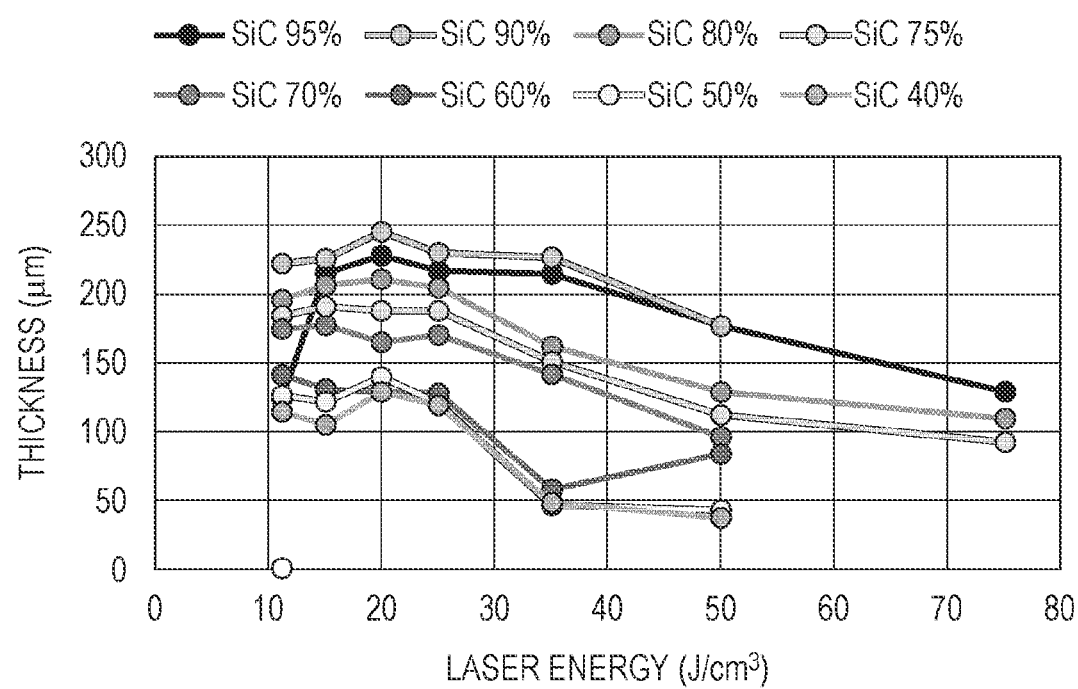
FIG. 3 is a plot showing the relationship between the height of objects fabricated with raw material powder compositions and the spatial laser power density.

The height of the resulting object was measured without separating the resulting object from the plate. FIG. 3 shows the relationship between the height of the objects fabricated with the raw material powder compositions and the spatial laser power density.

The resulting objects were evaluated based on the difference in height between the object and the rectangular solid model (250 μm). Table 1 presents the mixing ratios of powders 1 to 9 used as the raw material powders for fabrication, the spatial laser power densities of the irradiation laser light, and the evaluation results together. The evaluation criteria were as follows. "-" in the Table denotes unexamined cases.
A: The height was 200 μm or more
B: The height was 170 μm to less than 200 μm
C: The height was less than 170 μm
D: An object could not be fabricated For the objects rated as A, the amount of decrease per layer by laser irradiation was reduced to the level corresponding to the increase in density by melting the powder. The amount of decrease of the objects rated as B was larger than that of the objects rated as A, but the explosive temperature increase by combustion synthesis was suppressed to reduce the scattering of the raw material powder from the fabrication area. Accordingly, intended fabrication objects can be formed by controlling slice data and fabrication conditions. In the case of a rating of C, the temperature increase by combustion synthesis could not be suppressed, and the raw material powder was scattered and did not remain sufficiently in the fabrication area. Consequently, the fabrication accuracy was markedly low not only in the height direction but also in the fabrication face direction. In the case of a rating of D, the powder did not melt, and an object could not be fabricated.

Each powder presented in Table 1 contains metallic silicon powder and carbon powder in the same atomic percentage, but a deviation of about ±10% from the target atomic percentage is tolerable.

TABLE 1

| | Raw material powder mixing ratio (at %) | | | Spatial laser power density (J/mm³) | | | | | | |
|---|---|---|---|---|---|---|---|---|---|---|
| | SiC | Si | C | 11.1 | 15 | 20 | 25 | 35 | 50 | 75 |
| Powder 1 | 40 | 30 | 30 | C | C | C | C | C | C | — |
| Powder 2 | 50 | 25 | 25 | C | C | C | C | C | C | — |
| Powder 3 | 60 | 20 | 20 | B | C | C | C | C | C | — |
| Powder 4 | 70 | 15 | 15 | B | B | B | B | C | C | — |
| Powder 5 | 75 | 12.5 | 12.5 | A | A | A | A | B | C | — |
| Powder 6 | 80 | 10 | 10 | A | A | A | A | B | C | C |
| Powder 7 | 90 | 5 | 5 | A | A | A | A | A | B | C |
| Powder 8 | 95 | 2.5 | 2.5 | A | A | A | A | A | B | C |
| Powder 9 | 100 | 0 | 0 | C | C | C | C | B | — | — |

SiC has no melting point and decomposes at 2545° C. For the powders of the constituent elements of SiC, C powder has a decomposition point of 3642° C., and Si powder has a melting point of 1414° C. Powders 1 to 9 were irradiated with laser light under the conditions where combustion synthesis of Si and C occurred and heated the material to a temperature at which the Si powder melted. The objects fabricated by irradiating powders 1 to 6 with laser light at a spatial laser power density of 11.1 [J/mm³] were subjected to X-ray diffraction to determine the composition. It was confirmed that all the fabricated objects contained portions in which SiC powder was bound with Si and $Si_{0.98}C_{0.02}$ portions in which the Si diamond lattice was partially substituted by C atoms.

Four 4 mm×3 mm×40 mm strip-shaped objects were formed for each mixing ratio of powders 1 to 6 used as the raw material powders on stainless-steel base plates at a spatial laser power density of 15 [J/mm³].

First, a sufficient amount of liquid phenol resin (PR-50607B produced by Sumitomo Bakelite) was dropped onto two of the four objects on the base plates, and the objects were defoamed in a vacuum. After excess phenol was wiped off from the surfaces of the objects, the objects were heated at 160° C. on a hot plate to thermally cure the phenol resin.

Then, the objects were separated from the base plates with a diamond wire saw. When sections of the objects impregnated with the phenol resin were observed under a microscope, it was confirmed that the phenol resin sufficiently penetrated into voids. Also, the objects did not chip when separated from the base plates.

In contrast, some of the objects not impregnated with the phenol resin chipped at the edges when separated from the base plates. The objects not impregnated with the phenol resin were to be used for comparison in strength with the objects impregnated with the phenol resin and were, therefore, not subjected to the subsequent steps.

The objects impregnated with the phenol resin were immersed in a liquid phenol resin, followed by vacuum defoaming and impregnation again. Then, those objects were heat-treated at 800° C. for 30 minutes to carbonize the phenol resin.

After the carbonization of the phenol resin, the volume and weight of each object were measured, and the void fraction of the object was calculated. The amount of Si required for SiC impregnation was calculated from the void fraction. Alumina balls of 2 mm in diameter were laid as a setter on the bottom of a crucible so that the object did not adhere to the crucible, and the object was placed in the crucible. Then, an amount of Si pieces that was about 20% larger than the required amount calculated above was placed over the object, followed by heat treatment. The heat treatment was performed at 1500° C. for 1 hour in an Ar atmosphere with a pressure of 2600 Pa. Since excess Si was deposited on the surface of the resulting object, the object was finished into a 4 mm×3 mm×40 mm rectangular strip by grinding and polishing. The surface of the object after impregnation was observed under a microscope. Cracks and cavities were significantly reduced.

The objects subjected to solid-phase impregnation and the objects not subjected to solid-phase impregnation were each subjected to a four-point bending test evaluation using an Instron universal testing system (Model 4507, 1 kN load cell). The evaluation conditions were as follows:
Atmosphere: ambient air
Crosshead moving speed: 0.5 mm/min
Distance between fulcrums: L=30
Jig material: SiC The results of the four-point bending test evaluation were compared between the objects subjected to solid-phase impregnation and the objects not subjected to solid-phase impregnation in each group of objects fabricated under the same conditions. As a result, it was confirmed that, in each group, performing solid-phase impregnation increases the bending strength of the object four times or more.

After the four-point bending test evaluation, the objects subjected to solid-phase impregnation were examined for their compositions by X-ray diffraction. Each object contained 75 at % or more of SiC and 25 at % or less of Si.

The results described above show that it is possible to conduct object fabrication while reducing explosive heat of reaction due to combustion synthesis by adding an appropriate amount of silicon carbide powder into a raw material powder containing metallic silicon powder and carbon powder and controlling the spatial laser power density of the irradiating laser light according to the mixing ratio of the raw material powder.

More specifically, it is recommended that a raw material powder containing silicon carbide powder in a proportion of 60 at % to less than 100 at % be irradiated with laser light at a spatial laser power density of 11 J/mm³ to 50 J/mm³. Preferably, the raw material powder contains silicon carbide powder in a proportion of 75 at % to 95 at %, and the raw material powder is irradiated with laser light at a spatial laser power density of 15 J/mm³ to 35 J/mm³.

Fabrication performed in such ranges allows objects containing silicon carbide as the main constituent to be produced by applying heat required to induce a reaction between elements or compounds while reducing explosive heat of reaction caused by combustion synthesis.

After completion of the fabrication, the resulting objects were separated from the base plates and heat-treated at 1500° C. in an Ar atmosphere for 1 hour. X-ray diffraction of the articles after this heat treatment showed that the heat treatment melted the Si and allowed the melted Si to react with the C powder remaining in the object, thus converting Si and C into SiC. The heat treatment temperature of 1500° C. is adequately lower than the decomposition temperatures of SiC and C. Accordingly, highly dense articles were able to be produced without decomposing SiC and C.

According to the present invention, articles containing silicon carbide as the main constituent can be produced by powder bed fusion at lower energy than known methods without using resin or other organic materials.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A method for producing an article containing silicon carbide as a main constituent, the method comprising:
   a plurality of sets of steps of
      forming a layer of a raw material powder; and
      irradiating the layer with laser light according to three-dimensional model data,
   wherein the raw material powder is a mixture of silicon carbide powder, metallic silicon powder, and carbon powder, and
   wherein the laser light used in the step of irradiation with laser light has a spatial laser power density of 11 $J/mm^3$ to 50 $J/mm^3$,
   wherein the silicon carbide powder has a smaller average particle size than the metallic silicon powder, and the carbon powder has a smaller average particle size than the silicon carbide powder.

2. The method for producing an article according to claim 1, wherein the laser light used in the step of irradiation with laser light has a spatial laser power density of 15 $J/mm^3$ to 35 $J/mm^3$.

3. The method for producing an article according to claim 1, wherein the raw material powder consists of SiC, Si, and C.

4. The method for producing an article according to claim 1, wherein the number of atoms of the carbon in the raw material powder is higher than or equal to the number of atoms of metallic silicon.

5. The method for producing an article according to claim 1, wherein the raw material powder contains the silicon carbide powder in a proportion of 60 at % to less than 100 at %.

6. The method for producing an article according to claim 1, wherein the step of irradiation with laser light includes dividing an area to be irradiated into a plurality of sections and discretely irradiating the plurality of sections with the laser light.

7. The method for producing an article according to claim 6, wherein the plurality of sections are each a rectangular section with a size of 5 mm×5 mm or less.

8. A method for producing an article containing silicon carbide as a main constituent, the method comprising:
   a plurality of sets of steps of
      forming a layer of a raw material powder, and
      irradiating the layer with laser light according to three-dimensional model data;
   a step of impregnating with a liquid resin an object fabricated through the plurality of sets of the steps of forming a layer of the raw material powder and irradiating the layer with laser light;
   a step of heating the object impregnated with the liquid resin to carbonize the resin;
   a step of impregnating with melted metallic silicon the object in which the resin is carbonized; and
   a step of converting the metallic silicon into silicon carbide by heating the object impregnated with the metallic silicon.

9. The method for producing an article according to claim 8, wherein the resin is a phenol resin.

10. The method for producing an article according to claim 8, further comprising a step of post-processing a surface of the object obtained after the step of converting the metallic silicon into silicon carbide.

11. A raw material powder for producing an article containing silicon carbide as a main constituent by powder bed fusion,
   the raw material powder being a mixture of silicon carbide powder, metallic silicon powder, and carbon powder,
   wherein the silicon carbide powder has a smaller average particle size than the metallic silicon powder, and the carbon powder has a smaller average particle size than the silicon carbide powder.

12. The raw material powder according to claim 11, wherein the number of atoms of carbon in the raw material powder is higher than or equal to the number of atoms of metallic silicon.

13. The raw material powder according to claim 11, wherein particles in the raw material powder have particle sizes of 0.5 μm to 100 μm.

14. The raw material powder according to claim 11, wherein the raw material powder contains the silicon carbide powder in a proportion of 60 at % to less than 100 at %.

15. The raw material powder according to claim 11, wherein the raw material powder contains the silicon carbide powder in a proportion of 75 at % to 95 at %.

16. The raw material powder according to claim 11, wherein the raw material powder contains the metallic silicon powder in a proportion of 2.5 at % to 20 at %.

17. The raw material powder according to claim 14, wherein the raw material powder contains the metallic silicon powder in a proportion of 2.5 at % to 12.5 at %.

18. The raw material powder according to claim 11, wherein the raw material powder contains the carbon powder in a proportion of 2.5 at % to 20 at %.

19. The raw material powder according to claim 14, wherein the raw material powder contains the carbon powder in a proportion of 2.5 at % to 12.5 at %.

20. A method for producing an article containing silicon carbide as a main constituent, the method comprising:
   a plurality of sets of steps of
      forming a layer of the raw material powder according to claim 11; and
      irradiating the layer with laser light according to three-dimensional model data.

* * * * *